April 16, 1968     T. J. DIETZ     3,378,612
METHOD OF MAKING FOAMED ARTICLES

Filed Jan. 7, 1964     2 Sheets-Sheet 1

April 16, 1968   T. J. DIETZ   3,378,612
METHOD OF MAKING FOAMED ARTICLES
Filed Jan. 7, 1964

United States Patent Office 3,378,612
Patented Apr. 16, 1968

3,378,612
METHOD OF MAKING FOAMED ARTICLES
Thomas J. Dietz, Chester Heights, Pa., assignor to FMC Corporation, Philadelphia, Pa., a corporation of Delaware
Filed Jan. 7, 1964, Ser. No. 336,243
7 Claims. (Cl. 264—45)

ABSTRACT OF THE DISCLOSURE

Method of forming an article having a core of generally closed cell cellular construction and an unbroken seamless outer covering by foaming a polymeric material within a mass or partially formed envelope of fluid film-forming material so as to expand the latter, and thereafter setting the foamed and film-forming materials.

Figure 1:
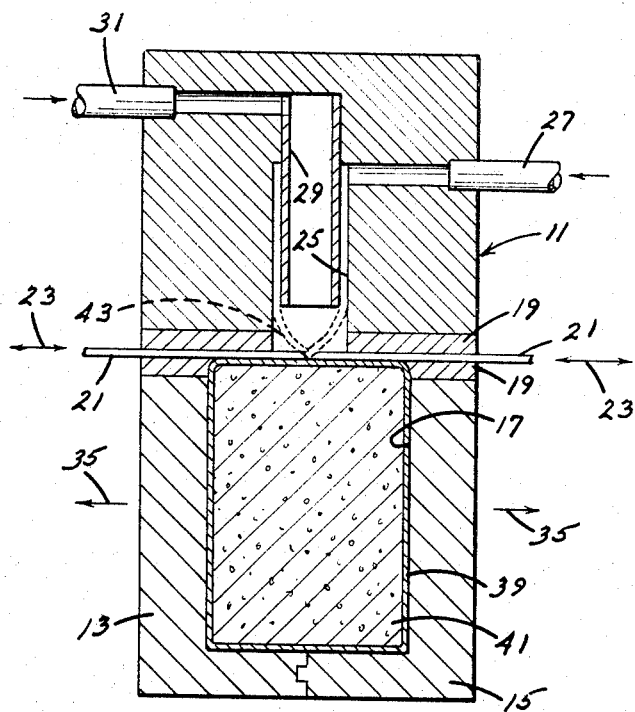

This invention relates to an improved method of producing shaped articles having cellular or foamed structures.

Shaped articles formed of foamed or expanded plastic polymeric materials are light in weight and exhibit good buoyancy and heat and sound insulating properties. Generally such articles are formed by expanding a suitable polymeric material within a mold by means of heat, an inert gas or a chemical blowing agent and then causing the expanded material to set. Urethane foams, for example, are the reaction products of a polyol and polyisocyanate which have been expanded by a blowing agent.

A disadvantage of shaped articles formed in this manner is that the resulting cellular or aerated structure gives the articles rough and irregular surfaces which are not only unattractive but, more important, permit liquids or gases to permeate therethrough. When molding polyurethane foams still further difficulties arise, namely: (1) the structural weakness of the skin of the urethane molding which is exhibited during expansion; (2) the poor mold release properties; and (3) the difficulty in formulating the zero loss of physical properties on hydrolysis aging without sacrifice of other properties. While various formulations and molding procedures have been proposed for avoiding one or more of these difficulties none have been completely satisfactory. Accordingly, a primary object of this invention is to provide generally new or improved and more satisfactory method for making articles having foamed or cellular structures.

Another object of this invention is to provide a method for producing a foamed and shaped article having a substantially continuous and unbroken outer covering or skin.

Still another object of the invention is to provide a method of forming a mass of foamed or cellular material with a substantially continuous or unbroken skin concomitantly with the shaping therof into a desired configuration.

A further object is to provide a simple and less costly method of producing foamed or cellular shaped articles.

Still further objects will appear from the following description.

These objects are accomplished in accordance with the present invention by a method which involves shaping a gob or mass or parison of fluid or flowable film-forming material within a desiredly shaped mold into the form of a seamless envelope and filling the same with a flowable mass of expanded or foamed polymeric material and thereafter causing the filled envelope to set.

The mass of flowable or fluid film-forming material is preferably shaped into the form of a seamless envelope under the inflating action of the polymeric material itself. In other words, the polymeric material is expanded or foamed after it has been injected into the mass of film-forming material and thereby causes such mass to assume the desired envelope shape. Alternatively, the mass of fluid film-forming material may be at least partially expanded with an inflating medium and then filled with the at least partially expanded or foamed polymeric material. For example, the mass of film-forming material may be expanded into the form of an envelope by a gas or vapor after which an already expanded or partially foamed polymeric material may be introduced therein. With this procedure, an unexpanded polymeric material may be injected into the mass of film-forming material prior to or along with a gas or vapor which serves to inflate such mass against the walls of a surrounding mold. As the pressure of this inflating medium is released, the injected polymeric material immediately expands or foams to thereby fill the formed envelope. As a still further alternative, the mass of fluid film-forming material may be inflated by a gaseous medium concomitantly as a polymeric material is being expanded or foamed therein.

In all of the procedures noted above, the expansion of the mass of fluid film-forming material is effected entirely within the mold. Further, in those procedures in which the mass of fluid film-forming material is being expanded at lease partially by an inflating medium, expansion may be effected by air or superheated steam or other gas or vapor which is non-reactive with the particular film-forming material being employed, or by means of a vacuum applied through the mold walls.

The mass of fluid or flowable film-forming material is preferably suspended from a supply nozzle during expansion and filling and may be initially delivered as a unitary gob or as a tube which is closed prior to expansion. The expanded envelope of film-forming material may be set as it first engages with the walls of the surrounding mold or after it has been filled with the expanded or foamed polymeric material. Severance of the film-forming material from the supply nozzle serves to seal or close the expanded and now filled envelope. Ejection of the resulting article from the surrounding mold is effected after the filled envelope has been set to such an extent as to retain the shape which has been imparted thereto during the molding step.

The flowable or fluid film-forming material from which the envelope is formed may be either of thermoplastic or thermosetting character and may be made from a wide variety of materials which may be rendered plastic or in flowable or fluid condition. Preferred types include the blow molding grades of (1) polystyrene and styrene copolymers; (2) polyethylene and ethylene copolymers; (3) polyacrylonitrile and acrylonitrile copolymers; (4) polyvinyl chloride and vinyl chloride-acetate copolymers; (5) polypropylene and propylene copolymers; (6) polyvinyl acetate and vinyl acetate copolymers; (7) polyvinyl alcohol; (8) polyvinylidene chloride and vinylidene chloride copolymers; (9) acrylic ester polymers and copolymers; (10) cellulose acetate; (11) ethyl cellulose; (12) polyesters and polyester-polyethylene mixtures; and (13) polyamides and polyamide-polyethylene mixtures. Suitable plasticizing ingredients, fillers and reinforcing agents both fibrous and particulate also are contemplated. It is to be understood that the mentioning of these particular materials is not intended to limit the invention thereto but merely to illustrate the wide variety of film-forming materials that can be used in carrying out the invention.

The film-forming material may be converted into a fluid or flowable mass or gob by fusion or by the incorporation of plasticizers or solvents capable of dissolving or dispersing the material. Thus, any of the thermoplastic materials may be heated to fusion after which the expanding or inflating medium may be introduced into a gob thereof, preferably at the same temperature as the fused material.

If necessary, the temperature of fusion may be lowered by the incorporation of a plasticizer either of solid or liquid character. When plasticizers or solvents are incorporated into the plastic material to form the gob, the plasticizer or solvent is preferably non-reactive with the expanding medium.

Volatile solvents may be employed for dissolving or dispersing the film-forming material so that the gob may be formed at room temperature and expanded into the shape of an envelope, with the setting or coagulation of the expanded envelope of fluid film-forming material occurring by volatization of the solvent after expansion thereof against the mold walls. Known solvents and plasticizers may be employed, the selection depending upon the particular film-forming material to be used. Thus, acetone or dioxane may be used for vinyl acetate or copolymers of vinyl acetate or vinyl chloride or acrylonitrile. The concentration of the film-forming material, when a solution thereof is used, is preferably as great as possible and is limited only by the necessity that the plastic mass be capable of expanding under the pressure of the expanding medium yet be of a reasonably viscous coherent plastic character which is capable of supporting its own weight.

Any material, and particularly thermoplastic, resinous material which can be expanded or foamed by conventional techniques, may be employed in forming structures in accordance with the method of the present invention. Preferred materials include (1) polystyrene which may be thermally expanded with a low boiling hydrocarbon such as petroleum ether; (2) low molecular weight styrene prepolymer which may be expanded with an inert gas under pressure such as nitrogen while the polymer is sufficiently fluid, followed by the completion of polymerization; (3) plastisols of vinyl chloride which may be also expanded with an inert gas under pressure and then set in the expanded state with heat; (4) elastomers and thermoplastic resins which can be expanded with chemical blowing agents catalyzed by heat; and (5) liquid urethanes which can be reacted with water in the presence of modifying ingredients. Here again, the mentioning of these particular materials is not intended to limit the invention thereto.

The articles which are formed by the method of the present invention possess a cellular internal structure and a tough outer covering or skin which is continuous, unbroken, and of substantially uniform thickness along all portions thereof. Such articles are adapted for a variety of uses and are particularly well suited in applications in which light weight, buoyancy, heat and sound insulation, shock absorbency, etc. are important considerations.

The method of the present invention is hereafter described as applied to molding of polyurethane foams, wherein urethane prefoam is injected into and expanded or foamed within a flowable or fluid mass or tube of polyethylene. The urethane prefoam is preferably formed by mixing a hot prepolymer with a surfactant and curing agent and then combining this mixture with a blowing agent immediately prior to injecting the same into the mass or tube of polyethylene. In view of the inherent impermeability of the expanding envelope of polyethylene no escape of the expanding medium is encountered. Further, the urethane cells which are nearest to the polyethylene are supported and protected by this expanding envelope and thus do not rupture because of pressure or temperature imbalance or because of reaction with the ambient atmosphere. Thus, in the finished article, the cells of the urethane foam are all or predominately of closed configuration so that such article exhibits greater stiffness, strength and flex endurance than articles formed by conventional procedures. Moreover, the expanded urethane is completely enclosed by the polyethylene envelope and is thereby well protected during use.

Of still further importance is that the flowable or fluid mass of polyethylene permits normal expansion of the contained urethane without causing great shear forces to develop, as they do at the interface of an expanding foam and a rigid mold employed in known methods. In effect the polyethylene serves as an expanding container for the expanding urethane.

Additionally, since expansion of the mass of polyethylene occurs within a cold mold, taken with the fact that polyethylene is employed as the envelope material, mold release problems are of no concern. There is no necessity to control the temperature of the mold to insure safe release of the molded article and, in most all cases, the articles are easily released and exhibit good over-all appearance.

Figure 2:
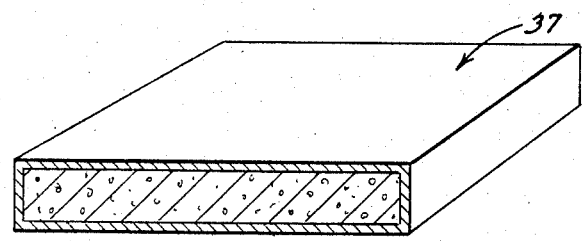
Figure 3:
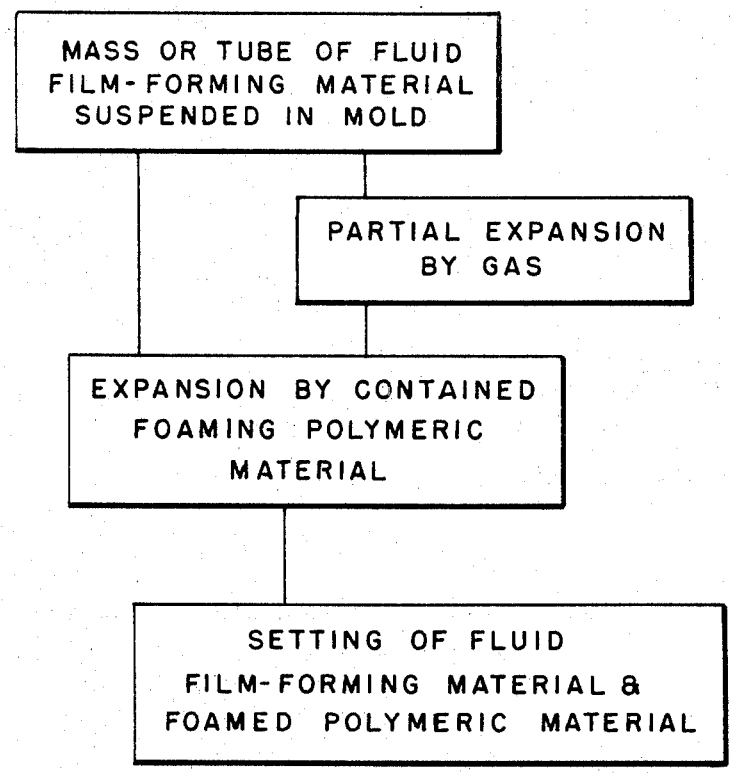

In the drawing, FIGURE 1 is a vertical section taken through a molding apparatus which is suitable for use in practicing the method of the present invention;

FIGURE 2 is a perspective view of a shaped article formed in accordance with the method of the present invention; and FIGURE 3 is a flow sheet showing the order of the various steps of the method of the present invention.

Referring to FIGURE 1 of the drawing, apparatus which is suitable for use in practicing the method of the present invention includes an extruder 11 and cooperating mold sections 13 and 15 which together provide a desirably shaped mold cavity 17. Located between the extruder 11 and the mold sections 13 and 15 are guides 19 which slidably support blades 21 for reciprocating movement as indicated by arrows 23.

The extruder 11 is formed with a nozzle or bore 25 which opens into the mold cavity 17 and is connected with a pipe 27 through which molten polyethylene is delivered. Positioned within, but spaced from the nozzle 25 is a conduit 29 which also opens into the mold cavity 17 and is connected by a pipe 31 to a source of hot urethane prefoam.

The mold sections 13 and 15 are mounted for movement toward and away from each other as indicated by arrows 35. As heretofore mentioned, the mold sections 13 and 15 together provide a cavity 17 which corresponds to the shaped articles which are intended to be produced. For simplicity and ease of description, the mold sections of the apparatus illustrated in the drawing are of such shape as to provide a panel 37, as shown in FIGURE 2.

In practicing the method of the present invention with the above described apparatus and in accordance with the flow sheet illustrated in FIGURE 3 of the drawing, the molten polyethylene is supplied through the pipe 27 and issues from the nozzle 25 in the form of a tube. The leading end of this tube is closed by the blades 21 so as to form a gob of polyethylene across the open end of the extruder bore 25 and extrusion is then continued to suspend a tube of polyethylene in-between the mold sections. The hot urethane prefoam is then injected into the tube of fluid polyethylene under pressure. This prefoam then expands as the delivery pressure is released. The polyethylene tube may be sealed by the blades 21 after it has been expanded but is preferably sealed above the level of the prefoam immediately after its delivery. The urethane prefoam is formulated so as to possess sufficient blowing capacity to completely inflate the molten polyethylene into the form of a seamless envelope 39 which engages with the mold walls forming the cavity 17. During this inflation, the molten polyethylene exerts a restraining influence on the contained expanding urethane and thereby insures more uniform blowing of the cellular or foamed material and the retention of its closed cell structure. In other words, and as heretofore mentioned, the expanding, impermeable envelope of fluid polyethylene prevents the escape of blowing agent. Further, the polyethylene supports the outermost layer of urethane cells as they are being expanded and thus such cells do not rupture because of pressure or temperature imbalance or because of some reaction with moisture in the ambient atmosphere.

The blades 21 are then urged into contact with each other to sever the expanded polyethylene envelope from the nozzle 25. It will be further noted that during this severance operation the gob of polyethylene which remains in the bore 25 is closed at its lowermost end, as shown at 43, and is thus prepared for forming the next article. The blades 21 may be heated to encourage the flow of the polyethylene during this final sealing and severing operation.

The now filled envelope of polyethylene is contained within the cavity 17 until sufficiently cooled so as to retain the particular configuration which has been imparted thereto by the mold sections and is then ejected therefrom. Of particular interest here is that no special problems are encountered in releasing the finished article from the surrounding mold. This result is due to the use of a relatively cold mold and a polyethylene as the enveloping material.

As shown in FIGURE 2, the resulting shaped panel 37 includes a cellular or foamed internal structure and a tough and moistureproof outer covering or skin which is continuous, unbroken and of substantially uniform thickness along all portions thereof. In view of its cellular or foamed structure the panel 37 is of light weight and exhibits good buoyancy and heat and sound insulating properties. Such panels are well suited for use in floats, building wall panels, in packaging, etc.

The invention may be further illustrated by the following examples.

Example I

A low density, blow molding grade of polyethylene was heated to about 300° F. and extruded as a tubing having a 1 inch outside diameter and ⅞ inch inside diameter. The extruded tubing was then cut near its free end with a pair of cool metal shears to close the same.

As a separate operation, a two part foamable mixture was prepared as follows:

Part A:                                                            Parts by weight
Urethane prepolymer—Adiprene L-100 (E. I. du Pont de Nemours & Co.) _____ 100
Surfactant—Organo-Silicone Copolymer L-520, (Union Carbide & Carbon Corp.) _____ 2
4,4' - methylene - bis - (2 - chloroaniline)—Moca (E. I. du Pont de Nemours & Co.) __ 
Part B:
N,N' - dimethyl - N,N' - dinitrosoterephthalamide—Nitrosan (E. I. du Pont de Nemours & Co.) _____ 4
Castor oil _____ 8

In making Part A of the mixture, 50 grams of the liquid prepolymer was heated in a convection oven to a temperature of 300° F. and thoroughly mixed with 1 gram of the surfactant. Within this mixture was dissolved 5 grams of the methylene-bis-orthochloroaniline curvative after it was heated to within its melting range.

Part B was prepared by melting 2 grams of the terephthalamide blowing agent with 8 grams of castor oil. This mixture was then rapidly added to Part A while the latter was still in a hot condition.

As the mixture of Parts A and B started to cream, it was injected into the hot polyethylene tubing to fill the same to about 3½ inches. This tubing was then pinched and sealed immediately above the level of the contained prefoam mixture and then placed within the cavity of a conventional aluminum mold. The cavity of this mold was 2⅛ inches in diameter and 3¾ inches in length and was fitted with electrical heating elements and internal cooling channels. To avoid any cooling at this stage the mold was preheated to a temperature of 300° F., which was well above that required to destroy the crystallinity of the polyethylene tubing as was indicated by the transition of its appearance from opaque to transparent.

The reaction which took place within the prefoam mixture caused the same to foam and expand the hot polyethylene tubing or envelope to the limits of the mold cavity. The mold was then quickly cooled to harden the expanded polyethylene envelope and the contained foam and, when opened, the finished article was easily ejected without the aid of any mold release agent.

The finished molded article had a continuous, pleasing, smooth surface which was impervious to moisture and tack-free. To improve its stiffness, the finished molded article was postcured in an air oven at 212° F. for a period of about 1½ hours.

Example II

A tubing of polyethylene was formed and closed at one end as described in Example I and, as a separate operation, a prefoam mixture was formulated, as follows:

Part A:                                                            Parts by weight
Urethan prepolymer—Adiprene L-100 (E. I. du Pont de Nemours & Co.) _____ 100
Surfactant—Organo-Silicon Copolymer L-520 (Union Carbide & Carbon Corp.) _____ 2
4,4'-methylene-bis-(2-chloroaniline)—Moca (E. I. du Pont de Nemours & Co.) _____ 10
Part B:
N,N'-dimethyl-N,N'-dinitrosoterephthalimide—Nitrosan (E. I. du Pont de Nemours & Co.) 4.0
Castor oil _____ 8.0
Triethylenediamine—Dabco (Houdry Process Co.) _____ 0.4

Part A was prepared in the same manner as described in Example I.

In preparing Part B, 0.2 gram of triethylenediamine was dissolved in 4 grams of castor oil at 75° C. This solution was mixed with 2 grams of the terephthalamide blowing agent to disperse the latter.

Parts A and B were then combined and the resulting mixture was quickly injected into the polyethylene tubing. The tubing was sealed to entrap the foaming mixture by enclosing the same within a hot mold as employed in Example I. The encapsulated foaming mixture rapidly expanded the surrounding envelope of molten polyethylene until the mold cavity was filled. Because of the presence of the amine catalyst in this formulation, the prefoam mixture expands and cures rapidly and thus the heated mold was positioned about the suspended molten polyethylene tubing before the prefoam mixture was injected therein.

Upon cooling the mold cavity to harden the polyethylene envelope, the resulting article was easily ejected and exhibited a smooth, continuous, and pleasing outer skin which was impervious to moisture and tack-free.

Example III

A tubing of polyethylene was formed and closed at one end as described in Example I and maintained at 300° F. while being suspended within a mold. In addition, a two part foamable liquid urethane mixture was prepared in accordance with the formulation given in Example I.

Parts A and B of the prefoam mixture were combined and then injected into the polyethylene tubing as the mixture started to cream. Immediately thereafter compressed air at room temperature and under a pressure of about 80 p.s.i. (pounds per square inch) was fed into the tubing to expand the same against the inside surface of the surrounding mold. The mold was cooled by water to cool and harden the expanded tubing. During this operation, the contained prefoam mixture remained at the bottom of the expanded polyethylene tubing.

After about 5 seconds, the compressed air was released from the expanded polyethylene tubing whereupon the prefoam rapidly foamed to fill the same. As the urethane foam reached the upper end of the tubing, the tubing was pinched closed and severed from the polyethylene supply source.

I claim:

1. A method of making shaped articles having an inner cellular structure and a substantially continuous and unbroken skin including the steps of positioning a gob of fluid film-forming material within a mold, delivering a foamable polymeric material into the gob of fluid film-forming material, causing the polymeric material to expand as a mass of bubbles within the gob of fluid film-forming material and inflate the same as a seamless envelope against the walls of the mold, sealing the expanded envelope of film-forming material in the area at which the foamable polymeric material was delivered to thereby provide a continuous and unbroken sheath about the contained expanded polymeric material, and causing the envelope of fluid film-forming material and contained polymeric material to set and retain the shape imparted thereto by the mold.

2. A method of making shaped articles having an inner cellular structure and a substantially continuous and unbroken skin including the steps of suspending a tube of fluid film-forming material within a mold, closing the free end of the tube, delivering an expandable polymeric material into the tube of fluid film-forming material through the open end thereof, sealing the open end of the tube of film-forming material, causing the polymeric material to expand as a mass of bubbles within the tube of fluid film-forming material and inflate the same against the walls of the mold to thereby provide a continuous and unbroken sheath about the contained expanded polymeric material, and causing the sheath of fluid film-forming material and contained polymeric material to set and retain the shape imparted thereto by the mold.

3. A method as defined in claim 2 wherein a fluid is delivered into the tube of fluid film-forming material to at least assist the polymeric material in expanding the film-forming material.

4. A method as defined in claim 3 wherein the delivered fluid causes the polymeric material to expand into a mass of bubbles.

5. A method of making shaped articles having an inner cellular structure and a substantially continuous and unbroken skin including the steps of positioning a gob of fluid film-forming material within a mold, delivering an inflating medium into the gob of fluid film-forming material along with a partially expanded polymeric material, causing the polymeric material to continue its expansion as a mass of bubbles within the gob of fluid film-forming material and, together with the inflating medium, shape the same as a seamless envelope against the walls of the mold, sealing the expanded envelope of film-forming material at the area in which the polymeric material is delivered to thereby provide a continuous and unbroken sheath about the contained mass of bubbles of polymeric material, and causing the envelope of fluid film-forming material and contained polymeric material to set and retain the shape imparted thereto by the mold.

6. A method of making shaped articles having an inner cellular structure and a substantially continuous and unbroken skin including the steps of suspending a mass of fluid thermoplastic film-forming material within a mold, at least partially expanding the mass of film-forming material as a seamless envelope having an opening therein, filling the envelope through said opening with a flowable, partially foamed polymeric material, causing the polymeric material to continue its foaming within the envelope of fluid film-forming material, severing the envelope of film-forming material from its source of supply and sealing the opening therein to thereby provide a continuous and unbroken sheath about the contained foamed polymeric material, and causing the envelope of fluid film-forming material and contained foamed polymeric material to set and retain the shape imparted thereto by the mold.

7. A method as defined in claim 6 in which the fluid film-fluid material is delivered as a tube which is closed at its free end.

References Cited

UNITED STATES PATENTS

| | | | |
|---|---|---|---|
| 2,766,478 | 10/1956 | Raley et al. | 264—4 |
| 2,872,760 | 2/1959 | Meissner | 264—4 |
| 617,230 | 1/1899 | Deborde | 264—50 X |
| 1,439,197 | 12/1922 | Smith | 264—50 X |
| 1,508,124 | 9/1924 | Richardson. | |
| 2,247,337 | 6/1941 | Raflovich | 264—45 |
| 2,349,177 | 5/1944 | Kopitke | 264—96 |
| 2,552,641 | 5/1951 | Morrison | 264—45 X |
| 2,700,183 | 1/1955 | Beare | 264—47 X |
| 2,714,076 | 7/1955 | Seckel. | |
| 2,962,407 | 11/1960 | Aykanian | 264—47 |
| 2,976,577 | 3/1961 | Gould | 264—45 |
| 2,989,783 | 6/1961 | Slapnik | 264—45 |
| 2,996,764 | 8/1961 | Ross et al. | 264—328 X |
| 3,059,253 | 10/1962 | Sager | 264—54 X |
| 3,091,053 | 5/1963 | Growald | 264—45 X |
| 3,162,706 | 12/1964 | Cheney | 264—97 |
| 3,229,005 | 1/1966 | Reifenhauser | 264—47 |
| 3,170,967 | 2/1965 | Williams et al. | 264—45 |
| 3,187,069 | 6/1965 | Pincus et al. | 264—45 |
| 2,794,756 | 6/1957 | Leverenz | 161—43 |
| 3,192,099 | 6/1965 | Beckman et al. | 161—43 |

FOREIGN PATENTS

| | | |
|---|---|---|
| 653,600 | 12/1962 | Canada. |
| 656,199 | 1/1963 | Canada. |
| 865,391 | 4/1961 | Great Britain. |

ALEXANDER H. BRODMERKEL, *Primary Examiner.*

ALEXANDER WYMAN, *Examiner.*

W. POWELL, P. E. ANDERSON, *Assistant Examiners.*